United States Patent
Ki et al.

(10) Patent No.: US 8,599,912 B2
(45) Date of Patent: Dec. 3, 2013

(54) APPARATUS AND METHOD FOR CHANNEL ESTIMATION IN MOBILE COMMUNICATION SYSTEM

(75) Inventors: Young-Min Ki, Suwon-si (KR); Hun-Kee Kim, Seoul (KR); Sung-Wook Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 520 days.

(21) Appl. No.: 12/582,523

(22) Filed: Oct. 20, 2009

(65) Prior Publication Data

US 2010/0098145 A1    Apr. 22, 2010

(30) Foreign Application Priority Data

Oct. 20, 2008    (KR) .................. 10-2008-0102458

(51) Int. Cl.
*H03H 7/30*    (2006.01)

(52) U.S. Cl.
USPC ........... 375/232; 375/259; 375/316; 375/343; 375/346; 370/210; 370/236; 370/352

(58) Field of Classification Search
CPC ............ H04L 25/0202; H04L 25/0204; H04L 25/0206; H04L 25/0212
USPC ......... 375/232, 316, 329, 260, 343, 246, 332, 375/346; 370/210, 236, 352
See application file for complete search history.

(56) References Cited

U.S. PATENT DOCUMENTS

| | | | |
|---|---|---|---|
| 5,903,610 A * | 5/1999 | Skold et al. ................... 375/285 |
| 7,339,999 B2 * | 3/2008 | Gore et al. .................... 375/260 |
| 7,675,962 B2 * | 3/2010 | Mergen et al. ................ 375/147 |
| 7,756,200 B2 * | 7/2010 | Cohen et al. .................. 375/233 |
| 7,801,210 B2 * | 9/2010 | Zhang et al. .................. 375/231 |
| 7,903,727 B2 * | 3/2011 | Xia et al. ....................... 375/231 |
| 8,031,787 B2 * | 10/2011 | Fechtel et al. ................ 375/260 |
| 2001/0055957 A1 * | 12/2001 | Doetsch et al. ............... 455/257 |
| 2005/0157801 A1 * | 7/2005 | Gore et al. .................... 375/260 |
| 2008/0043828 A1 * | 2/2008 | Dawid et al. .................. 375/230 |
| 2008/0130771 A1 * | 6/2008 | Fechtel et al. ................ 375/260 |

\* cited by examiner

*Primary Examiner* — Sophia Vlahos
(74) *Attorney, Agent, or Firm* — Jefferson IP Law, LLP

(57) ABSTRACT

An apparatus and method for reducing power consumption of a receiver of a mobile communication system are provided. The apparatus includes an adaptive multi-tap segment channel estimator for determining a segment size according to a delay spread value for each channel tap, for determining a channel estimation frequency by determining a sum of segment block energy, and for allocating each segment to the channel estimator.

16 Claims, 14 Drawing Sheets

APPARATUS AND METHOD FOR CHANNEL ESTIMATION IN MOBILE COMMUNICATION SYSTEM

PRIORITY

This application claims the benefit under 35 U.S.C. §119 (a) of a Korean patent application filed in the Korean Intellectual Property Office on Oct. 20, 2008 and assigned Serial No. 10-2008-0102458, the entire disclosure of which is hereby incorporated by reference.

BACKGROUND OF THE INVENTION

1. Field of the Invention

The present invention relates to an equalizer-based receiver in a mobile communication system. More particularly, the present invention relates to an apparatus and method for reducing power consumption of the receiver by decreasing a multi-tap size in an equalizer-based receiver in a mobile communication system.

2. Description of the Related Art

With recent standardization and commercialization of a mobile communication system that requires high-rate data transmission, such as a Wideband Code Division Multiple Access (WCDMA), High Speed Downlink Packet Access (HSDPA), and the like, research is presently conducted for an equalizer-based receiver suitable for high-rate data reception.

A conventional equalizer-based receiver includes an equalizer and a multi-tap channel estimator having a tap long enough to sufficiently receive a delay profile of a reception channel. The multi-tap with a sufficiently long length is designed where a multi-path reception channel has a long delay profile. However, in an actual channel reception environment, the multi-path reception channel does not always have the long delay profile.

Therefore, in a conventional method, the multi-tap with a long length is selectively used according to a channel environment without having to use all multi-taps. That is, a receiver estimates a delay profile of a received signal according to a multi-path to lock only a necessary tap among the multi-taps, and receives a signal by unlocking the remaining taps. The method of using the necessary tap by locking only the necessary tap can reduce power consumption since hardware elements are less used in certain situations and can remove performance deterioration caused by noise when a tap not having multi-path energy is locked.

Although the multi-tap with a long length is designed where the multi-path reception channel has a long delay profile, there is a decreased probability that the multi-path reception channel actually has such a long delay profile.

Accordingly, a channel estimator for guaranteeing performance of a receiver will have a long tap and hardware elements of the channel estimator will operate with a sufficiently long tap.

Therefore, a need exists for an equalizer-based receiver in a mobile communication system with a decreased multi-tap size for reducing hardware size and power consumption.

SUMMARY OF THE INVENTION

An aspect of the present invention is to address at least the above-mentioned problems and/or disadvantages and to provide at least the advantages described below. Accordingly, an aspect of the present invention is to provide a method and apparatus for operating an equalizer-based receiver in a mobile communication system.

Another aspect of the present invention is to provide a method and apparatus for reducing hardware complexity by decreasing a multi-tap size in an equalizer-based receiver of a mobile communication system.

Still another aspect of the present invention is to provide an apparatus and method for determining a channel estimation rate according to a multi-tap size in a mobile communication system.

Yet another aspect of the present invention is to provide an apparatus and method for performing an operation in a search mode for a neighbor tap or another channel according to a hardware occupancy rate in a mobile communication system.

In accordance with an aspect of the present invention, an apparatus for channel estimation in a mobile communication system is provided. The apparatus includes an adaptive multi-tap segment channel estimator for dividing a one-tap channel estimator into a plurality of segments, for determining a channel estimation frequency and a segment size for each channel tap, and for allocating each segment to the channel estimator.

In accordance with another aspect of the present invention, a method for channel estimation in a mobile communication system is provided. The method includes dividing a one-tap channel estimator into a plurality of segments, determining a channel estimation frequency and a segment size for each channel tap, and allocating each segment to the channel estimator.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, exemplary embodiments of the present invention provide an apparatus and method for reducing hardware complexity by decreasing a multi-tap size in an equalizer-based receiver of a mobile communication system.

Figure 1:
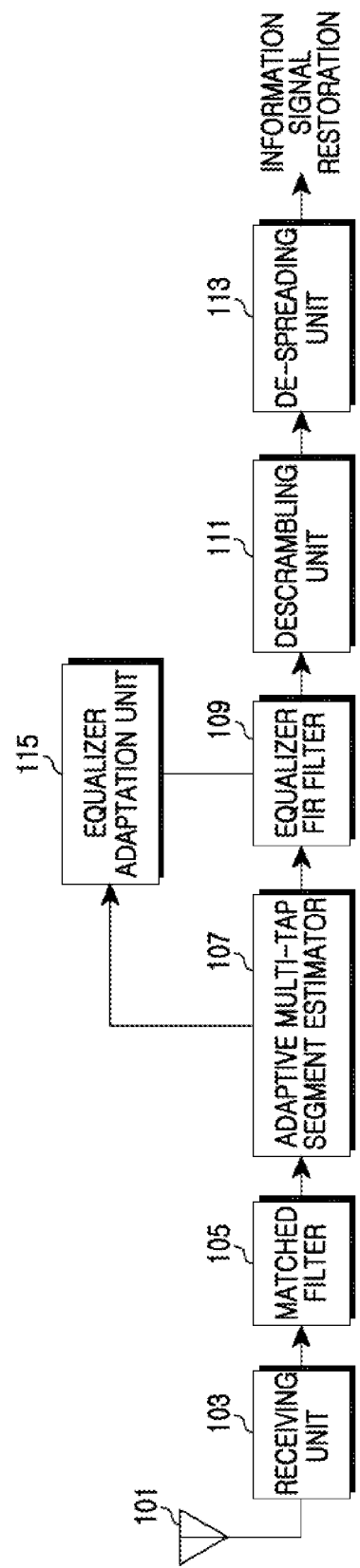
FIG. 1 is a block diagram illustrating a structure of a receiver in a mobile communication system according to an exemplary embodiment of the present invention.

FIG. 1 is a block diagram illustrating a structure of a receiver in a mobile communication system according to an exemplary embodiment of the present invention.

Referring to FIG. 1, the receiver may include an antenna 101, a receiving unit 103, a matched filter 105, an adaptive multi-tap segment estimator 107, an equalizer Finite Impulse Response (FIR) filter 109, a descrambling unit 111, a de-spreading unit 113 and an equalizer adaptation unit 115.

The matched filter 105 performs matched filtering between a signal received through the antenna 101 and the receiving unit 103 and a pre-stored reference signal, and provides the filtered signal to the adaptive multi-tap segment estimator 107.

Figure 2:
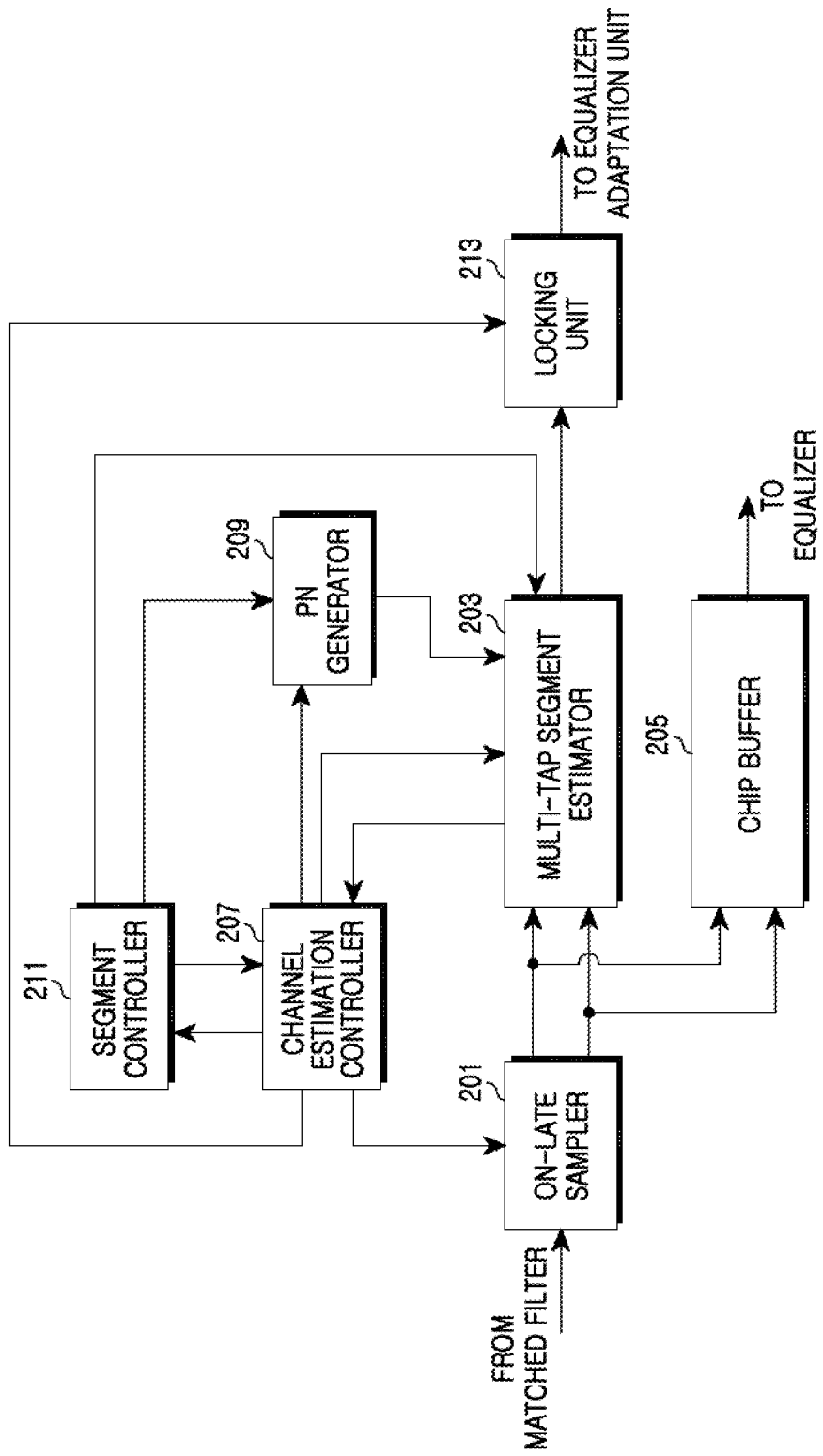
FIG. 2 is a block diagram illustrating a structure of an adaptive multi-tap segment estimator of a receiver according to an exemplary embodiment of the present invention.

The adaptive multi-tap segment estimator 107 de-spreads a signal whose transmission pattern is predefined, such as a pilot signal. Thereafter, the adaptive multi-tap segment estimator 107 estimates a channel by using a correlation with respect to an original data signal. More particularly, the adaptive multi-tap segment estimator 107 constructed as illustrated in FIG. 2 estimates a multi-tap located in a position suitable for a signal that has undergone a multi-path channel delay. The adaptive multi-tap segment estimator 107 will be described below in more detail with reference to FIG. 2.

The equalizer FIR filter 109 performs an equalization operation according to an equalizer tap gain provided from the equalizer adaptation unit 115. Thus, the equalizer FIR filter 109 compensates for a distortion of a multi-path reception signal provided from the adaptive multi-tap segment estimator 107. Thereafter, the equalizer FIR filter 109 provides the compensated signal to the descrambling unit 111.

The descrambling unit 111 descrambles the distortion-compensated signal and provides the descrambled signal to the de-spreading unit 113. The de-spreading unit 113 de-spreads the signal received from the descrambling unit 111.

The equalizer adaptation unit 115 determines an equalizer tap gain by using the multi-tap estimated by the adaptive multi-tap segment estimator 107 and provides the equalizer tap gain to the equalizer FIR filter 109.

FIG. 2 is a block diagram illustrating a structure of an adaptive multi-tap segment estimator of a receiver according to an exemplary embodiment of the present invention.

Referring to FIG. 2, the adaptive multi-tap segment estimator 107 includes an on-late sampler 201, a multi-tap segment estimator 203, a chip buffer 205, a channel estimation controller 207, a Pseudo random Noise (PN) generator 209, a segment controller 211 and a locking unit 213.

The on-late sampler 201 performs sampling on a double-chip rate signal provided from the matched filter 105 to generate an on-sample and a late-sample, each of which is a single-chip rate signal. Thereafter, the on-late sampler 201 provides the on-sample and the late-sample to the multi-tap segment estimator 203 and the chip buffer 205. More particularly, the on-late sampler 201 controls an output of the on-sample and the late-sample according to a slewing signal input from the channel estimation controller 207.

The multi-tap segment estimator 203 consists of $N_{seg}$ channel estimation segments and is a constitutional block for performing parallel channel estimation on consecutive taps. The multi-tap segment estimator 203 performs parallel channel estimation on N consecutive taps having a delay time difference of a half-chip interval.

The chip buffer 205 is a First Input First Output (FIFO)-type buffer which sequentially stores the on-sample and the late-sample, each of which is input from the on-late sampler 201, and sequentially outputs the on-sample and the late-sample. A data signal is buffered in the chip buffer 205 for a specific time period before being output so that the equalizer tap gain of the equalizer adaptation unit 115 and the data signal of the on-late sample and the late-sample are input to the equalizer FIR filter 109 at the same time.

The channel estimation controller 207 receives estimated channel values from the multi-tap segment estimator 203 and analyzes a channel characteristic. Operations, such as multi-tap energy determination, multi-tap lock control, Doppler estimation, delay profile analysis, slewing control, and the like are performed by the channel estimation controller 207, which will be described below in more detail with reference to FIG. 5.

The PN generator 209 generates a PN signal including a scrambling code required for de-spreading, an Orthogonal Variable Spreading Factor (OVSF) code, an antenna pattern, and the like and provides the generated signal to the multi-tap segment estimator 203 so that the multi-tap segment estimator 203 may restore the pilot signal. More particularly, the PN generator 209 controls an output of the PN signal according to a slewing signal input from the channel estimation controller 207.

The segment controller 211 receives information of each tap energy from the channel estimation controller 207. Thereafter, the segment controller 211 determines a segment size and a segment count. Further, the segment controller 211 determines an estimation rate for each segment and mapping to a hardware segment. Thereafter, the segment controller 211 provides information regarding the determined mapping to the channel estimation controller 207. In addition, the segment controller 211 controls channel estimation timing of the PN generator 209 and the multi-tap segment estimator 203. An operation of the segment controller 211 will be described below in more detail with reference to FIG. 6.

Figure 3:
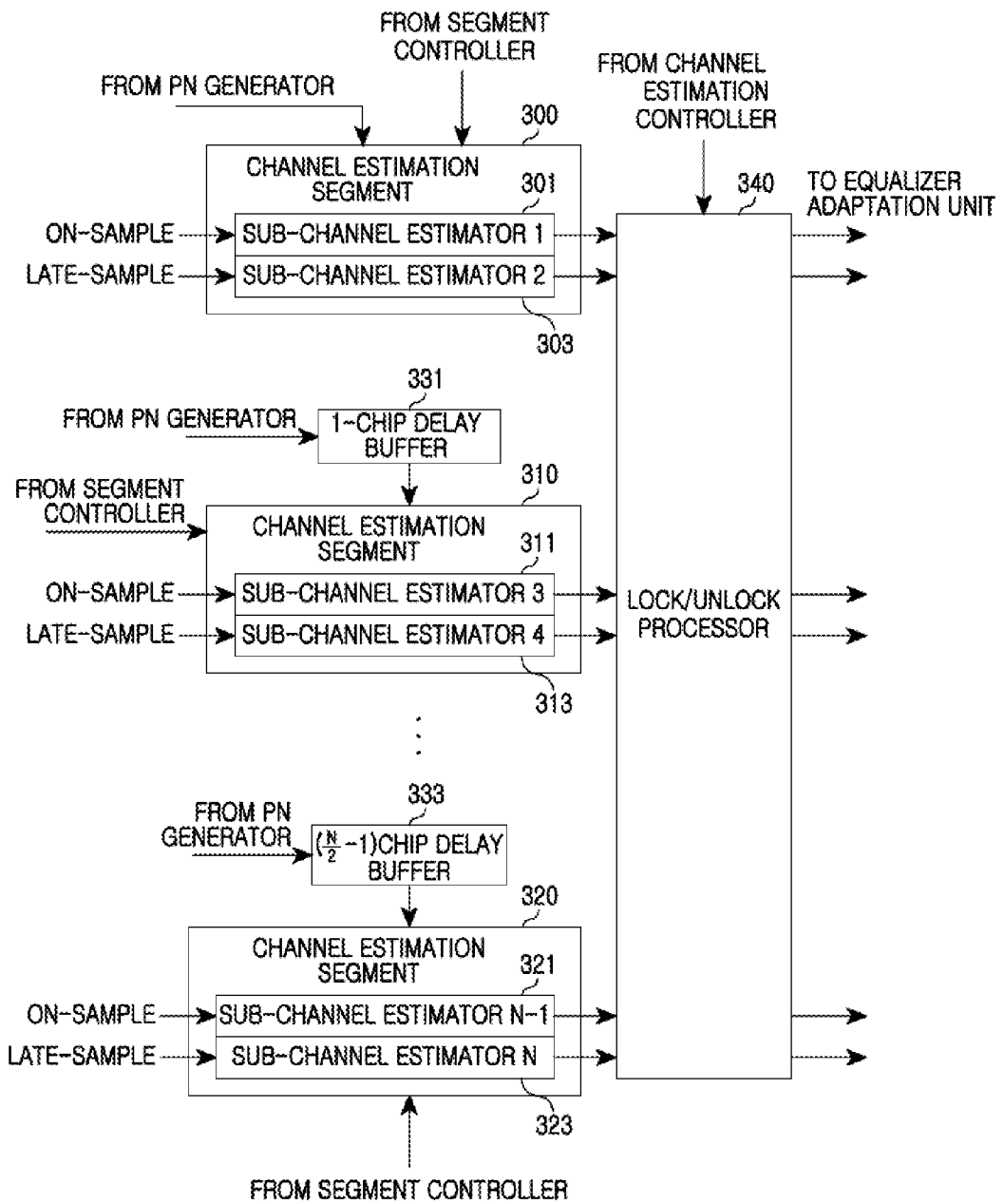
FIG. 3 is a block diagram illustrating a structure of a multi-tap segment estimator of an adaptive multi-tap segment estimator according to an exemplary embodiment of the present invention.

FIG. 3 is a block diagram illustrating a structure of a multi-tap segment estimator according to an exemplary embodiment of the present invention.

Referring to FIG. 3, the multi-tap segment channel estimator consists of channel estimation segments 300, 310 and 320 including N parallel sub-channel estimators 301, 303, 311, 313, 321 and 323, where N corresponds to a number of multi-taps. The multi-tap segment channel estimator obtains a channel estimation value for a multi-tap by using on-samples and the late-samples and a PN signal (or a PN code). In this case, among the N sub-channel estimators 301, 303, 311, 313, 321 and 323, odd sub-channel estimators 301, 311 and 321 receive on-samples and even sub-channel estimators 303, 313 and 323 receive late-samples. Further, the multi-tap segment channel estimator includes a plurality of delay buffers 331 and 333 so that a PN signal received from the PN generator 209 is delayed by a specific chip and is input to each of the sub-channel estimators 301, 303, 311, 313, 321 and 323. In this case, the delay buffer 331 and 333 delay the PN signal by a (N/2−1) chip so that the PN signal is input for each of the two sub-channel estimators with a time difference corresponding to a one-chip delay time.

The multi-tap segment channel estimator obtains a channel estimation value for a total of N multi-taps each having a half chip interval by using the N sub-channel estimators and provides the channel estimation value to the channel estimation controller 207. Further, the multi-tap segment channel estimator either locks or unlocks the multiple taps by using a lock/unlock processor 340 and provides resultant multiple taps to the equalizer adaptation unit 115.

Figure 4:
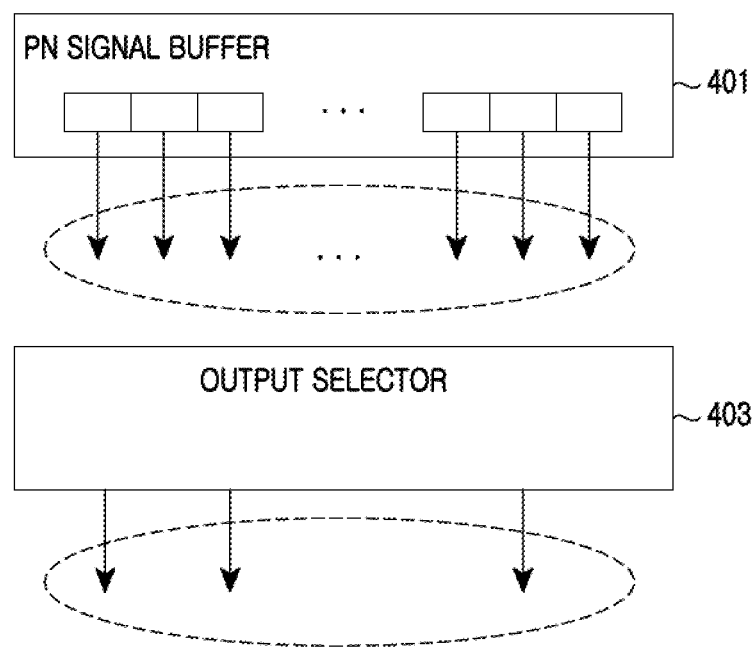
FIG. 4 is a block diagram illustrating a structure of a Pseudo random Noise (PN) generator of an adaptive multi-tap segment estimator according to an exemplary embodiment of the present invention.

FIG. 4 is a block diagram illustrating a structure of a PN generator according to an exemplary embodiment of the present invention.

Referring to FIG. 4, the PN generator includes a PN delay unit for adjusting a phase of a PN signal so that channel taps of different regions may be estimated for respective channel estimation segments. The PN delay unit consists of a PN signal buffer 401 and an output selector 403.

The PN signal buffer 401 is a buffer for storing the PN signal provided from the PN generator. Since the PN signal buffer 401 consists of $N_{max\_buf}$ buffers, the PN delay unit may implement phases of $0, 1, \ldots, (N_{max\_buf}-1)$ chips. The output selector 403 is a circuit for mapping $N_{max\_buf}$ buffer values to $N_{seg}$ outputs. Mapping information is obtained from an input signal provided from a channel estimation segment controller. Therefore, the PN delay unit generates $N_{seg}$ PN signals each having a different phase according to the mapping information, and delivers the PN signals to respective sub-channel segments.

Figure 5:
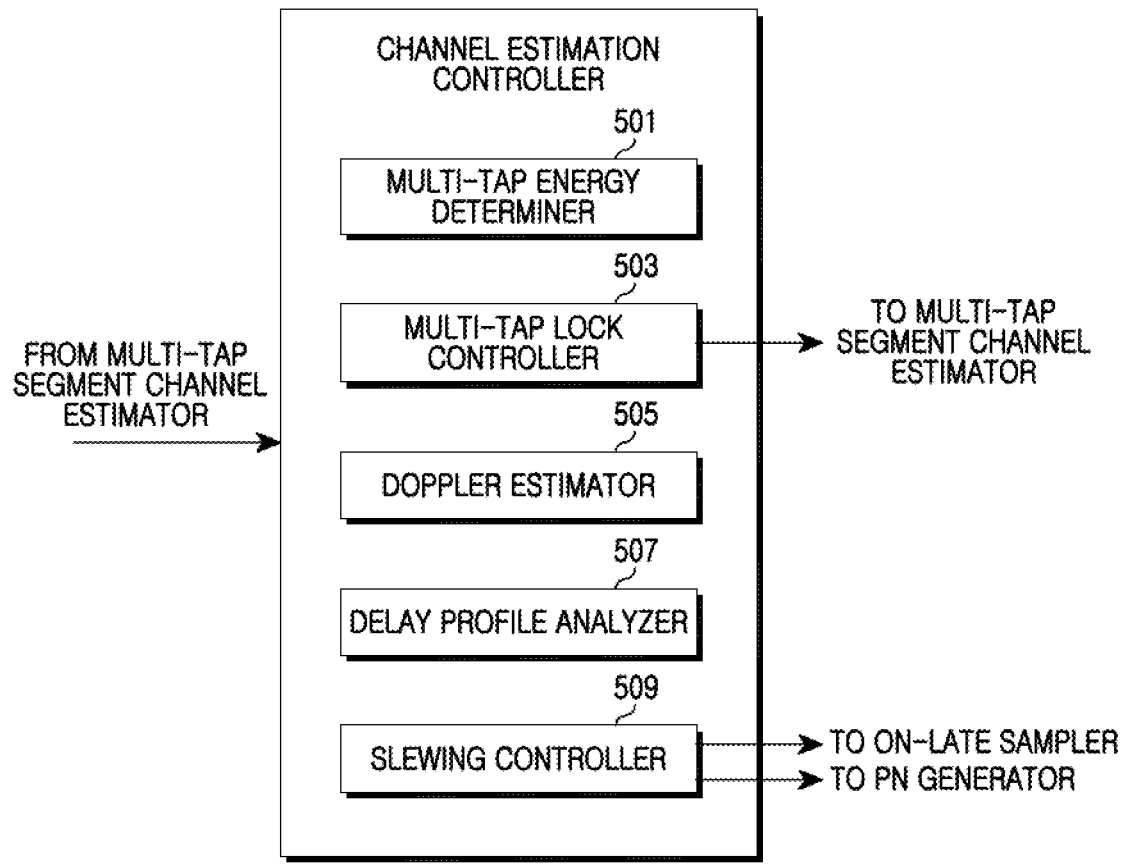
FIG. 5 is a block diagram illustrating a structure of a channel estimation controller of an adaptive multi-tap segment estimator according to an exemplary embodiment of the present invention.

FIG. 5 is a block diagram illustrating a structure of a channel estimation controller according to an exemplary embodiment of the present invention.

Referring to FIG. 5, the channel estimation controller includes a multi-tap energy determiner 501, a multi-tap lock controller 503, a Doppler estimator 505, a delay profile analyzer 507 and a slewing controller 509.

The multi-tap energy determiner 501 persistently measures time average power of a multi-tap channel and provides the measured time average power to the multi-tap lock controller 503. In this case, the time average power for the multi-tap channel may be determined by Equation (1) below.

$$P_n(t) = \frac{1}{N_\tau} \sum_{\tau=t-N_\tau+1}^{t} |h_n(t)|^2 \quad (1)$$

In Equation (1), $P_n(t)$ denotes a time average power value for an $n^{th}$ channel tap, $h_n(t)$ denotes a channel estimation value for the $n^{th}$ channel tap, N denotes a number of taps of the multi-tap segment estimator 203, and $N_\tau$ denotes a window size for obtaining time average power. When the window size increases, power control is performed using long-term power. When the window size decreases, power control is performed using short-term power. For example, if the window size is 1, power control is performed using only instantaneous power.

The multi-tap lock controller 503 obtains a sum of respective channel-taps' time average power values determined by the multi-tap energy determiner 501 as expressed by Equation (2) below. Thereafter, the multi-tap lock controller 503 determines a lock threshold as expressed by Equation (3) below by using the sum of the time average power values.

Equation (2) below shows a power sum at a time t.

$$P_{tot}(t) = \sum_{n=1}^{N} P_n(t) \quad (2)$$

In Equation (2), $P_{tot}(t)$ denotes a total sum of time average power at a time t, and $P_n(t)$ denotes a time average power value for an $n^{th}$ channel tap.

Equation (3) below shows a lock threshold.

$$T_L = P_{tot}(t)/T_\alpha \quad (3)$$

In Equation (3), $T_L$ denotes a lock threshold, $P_{tot}(t)$ denotes a total sum of time average power at a time t, and $T_\alpha$ denotes a coefficient of the lock threshold. The coefficient of the lock threshold has a different magnitude according to a Signal to Interference and Noise Ratio (SINR). That is, in an environment where the SINR is high, a value estimated by the sub-channel estimator is relatively accurate. Thus, the magnitude of the lock threshold is decreased to lock taps as many as possible. In an environment where the SINR is low, the value estimated by the sub-channel estimator includes relatively great noise. Thus, the lock threshold is increased to unlock taps as many as possible.

The multi-tap lock controller 503 determines whether each multi-tap is locked or unlocked according to Equation (4) below, and provides the determined result to the multi-tap segment estimator 203.

$$Lock_n = \begin{cases} 1, & \text{if } P_n(t) > T_L \\ 0, & \text{otherwise} \end{cases} \quad (4)$$

In Equation (4), 1 implies that a tap is locked and 0 implies that the tap is unlocked.

The Doppler estimator 505 determines a time-correlation of a multi-tap channel. Thereafter, the Doppler estimator 505 estimates a movement speed of the receiver according to the determined time-correlation. The result obtained by the Doppler estimator 505 is used to generate a parameter for determining a filter coefficient of a sub-channel estimator filter and a convergence rate of an equalizer.

The delay profile analyzer 507 analyzes a multi-path characteristic of a reception channel by using the estimated multi-tap channel values. When a multi-path delay profile moves over time or is located on one side of the multi-tap of the channel estimator, the slewing control block generates a slewing signal by performing slewing on multi-paths so that the multi-path delay profile is properly distributed in a center portion of the multi-tap of the channel estimator. In this manner, the slewing control block controls the on-late sampler and the PN generator.

The slewing controller 509 controls the on-late sampler and the PN generator in such a manner that, when the multi-path delay profile moves over time or is located in one side of the multi-tap of the channel estimator, a slewing signal is generated by performing slewing on multi-paths so that the multi-path delay profile is properly distributed in a center portion of the multi-tap of the channel estimator.

Figure 6:
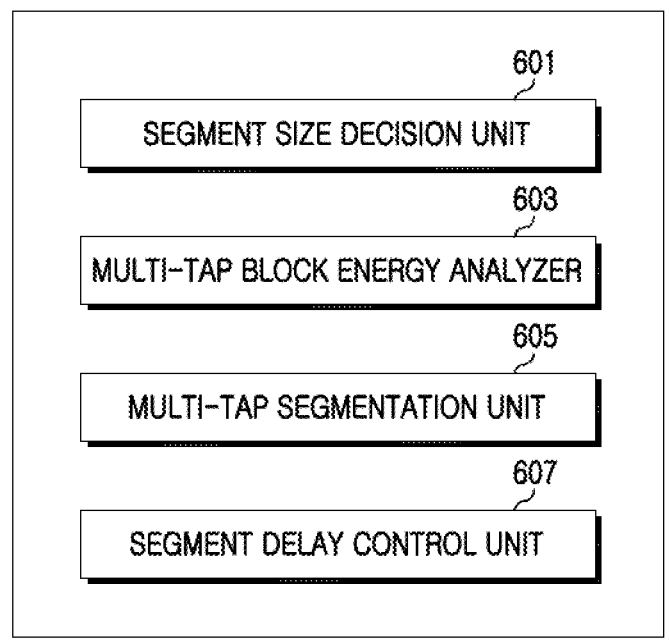
FIG. 6 is a block diagram illustrating a structure of a segment controller of an adaptive multi-tap segment estimator according to an exemplary embodiment of the present invention.

FIG. 6 is a block diagram illustrating a structure of a segment controller according to an exemplary embodiment of the present invention.

Referring to FIG. 6, the segment controller includes a segment size decision unit 601, a multi-tap block energy analyzer 603, a multi-tap segmentation unit 605 and a segment delay control unit 607. The segment size decision unit 601 analyzes a delay spread of a channel tap to determine a segment size $N_{sub}$. By using a segment count $N_{seg}$ and a total number N of sub-channel estimators (where $N=N_{seg} \times N_{sub}$), the segment size decision unit 601 may obtain the segment size $N_{sub}$.

The multi-tap block energy analyzer 603 determines a block sum of energy in each segment block. The energy block sum of each segment and a Doppler level are used by the multi-tap segmentation unit 605 to obtain an estimation frequency of each segment and to perform mapping to a hardware segment. The mapping information is delivered to the channel estimation controller. By using determined segment mapping information, the segment delay control unit 607 generates a signal for controlling a PN delay unit and a channel estimation segment in every channel estimation period.

Figure 7:
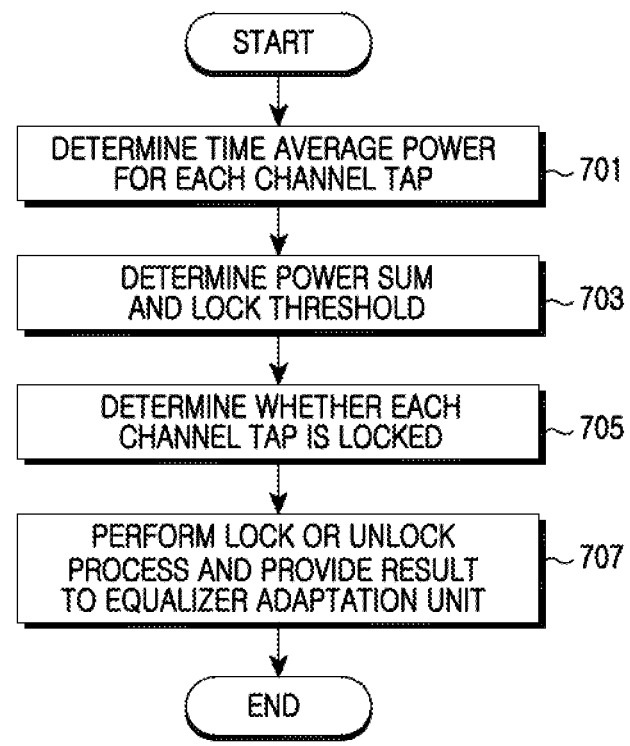
FIG. 7 is a flowchart illustrating a multi-tap lock control process of a channel estimation controller in a receiver according to an exemplary embodiment of the present invention.

FIG. 7 is a flowchart illustrating a multi-tap lock control process of a channel estimation controller in a receiver according to an exemplary embodiment of the present invention.

Referring to FIG. 7, in step 701, the channel estimation controller determines energy of each multi-channel tap, i.e., time average power, as expressed by Equation (1) above. In step 703, the channel estimation controller determines a total sum of the time average power and a lock threshold depending on the total sum thereof as expressed by Equations (2) and (3) above.

In step 705, the channel estimation controller determines whether each multi-tap is locked as expressed by Equation (4) above. In step 707, the channel estimation controller locks or unlocks each multi-tap and provides a resultant multi-tap to an equalizer adaptation unit. Thereafter, the procedure ends.

Figure 8:
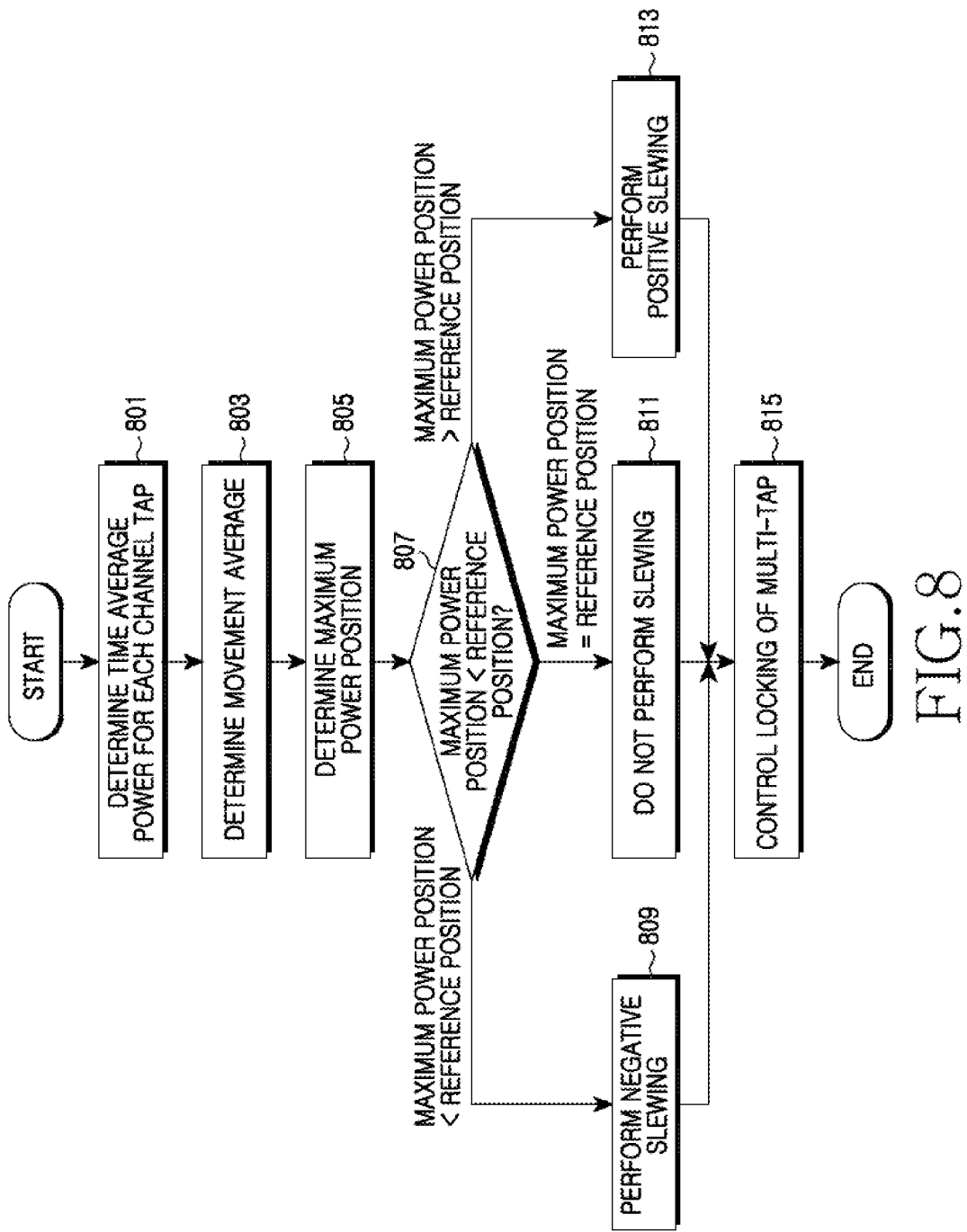
FIG. 8 is a flowchart illustrating a slewing process using a movement average in a receiver according to an exemplary embodiment of the present invention.

FIG. 8 is a flowchart illustrating a slewing process using a movement average in a receiver according to an exemplary embodiment of the present invention.

Referring to FIG. 8, in step 801, the receiver determines energy of each multi-channel tap, i.e., time average power, as expressed by Equation (1) above. In step 803, the receiver analyzes a delay profile of a multi-path channel by using a movement average mechanism as expressed by Equation (2) above. In step 805, the receiver determines a maximum power position as expressed by Equation (3) above.

In step 807, the receiver compares the maximum power position with a reference position.

If the maximum power position is less than the reference position, in step 809, the receiver performs negative slewing. If the maximum power position is greater than the reference position, in step 813, the receiver performs positive slewing. If the maximum power position is equal to the reference position, in step 811, the receiver determines not to perform slewing. Then, the procedure proceeds to step 815.

In step 815, the receiver controls locking of the multi-tap. Thereafter, the procedure ends.

Figure 9:
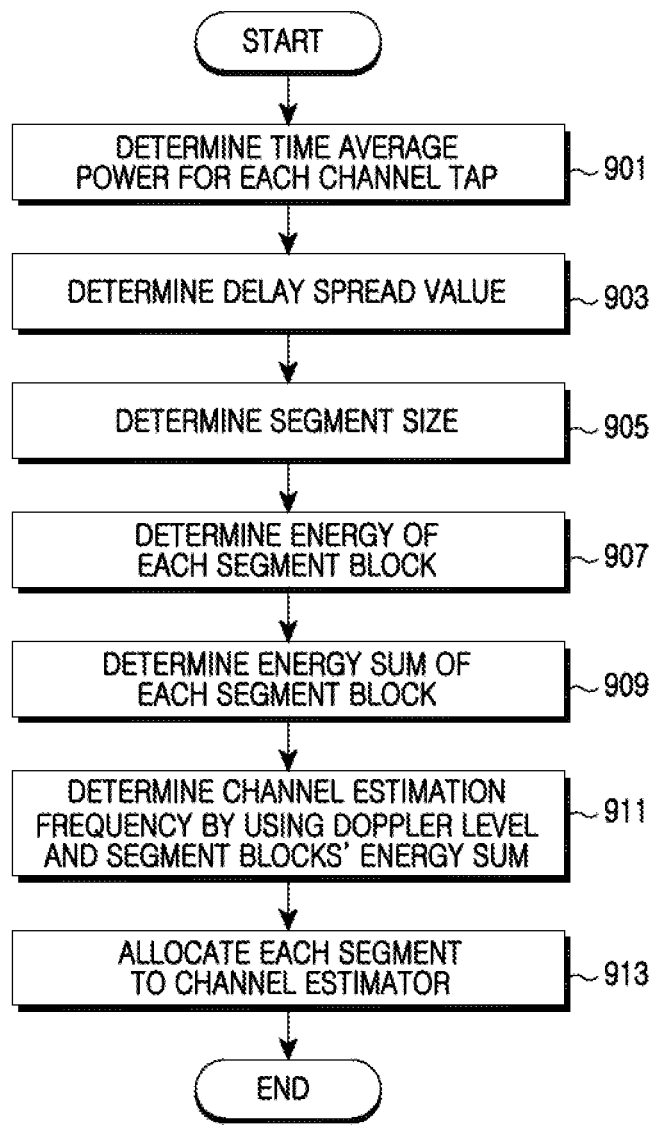
FIG. 9 is a flowchart illustrating a segment control process of a receiver according to an exemplary embodiment of the present invention.

FIG. 9 is a flowchart illustrating a segment control process of a receiver according to an exemplary embodiment of the present invention.

Referring to FIG. 9, the receiver determines time average power for each channel tap in step 901, and then determines a delay spread value in step 903.

The time average power for each channel tap is determined by a channel estimation controller of the receiver. The delay spread value may be determined by using a time average energy value provided from the channel estimation controller. In addition, the delay spread value is defined as a Root Mean Square (RMS) delay spread, that is, a square root of a second central moment of a power delay profile.

In step 905, the receiver determines a segment size by using Equation (5) below. In step 907, the receiver determines energy of each segment block.

$$N_{sub} = f(\text{delay\_spread}) \quad (5)$$

In Equation (5), f(•) denotes a simple increment function. The greater the delay spread value, the greater the segment size. The smaller the delay spread value, the smaller the segment size. This is because, when the delay spread value is great, energy of a received signal is widely distributed and thus a size of a segment requiring fast channel estimation needs to be large. Whereas when the delay spread value is small, the energy of the received signal is narrowly distributed and thus the size of the segment requiring fast channel estimation needs to be small. A function of determining a segment size may be implemented in a format of a table having several levels.

In step 909, by using Equation (6) below, the receiver determines a sum of each segment block's energy determined in step 907.

$$P_{s_i} = \frac{1}{N_{sub}} \sum_{j=0, j \in s_i}^{N_{sub}-1} P_j(t) \quad (6)$$

In Equation (6), $N_{sub}$ may be determined by using a segment count $N_{seg}$ and a total number N of sub-channel estimators (where $N = N_{seg} \times N_{sub}$). $P_j(t)$ denotes time average energy of a $j^{th}$ tap at a time t. A block sum of a segment $S_i$ may be obtained by averaging time average energy of taps belonging to the segment $S_i$.

After determining an energy sum of each segment block as described above, in step 911, the receiver determines a channel estimation frequency or a channel estimation rate by using the determined segment blocks' energy sum and a Doppler level. The Doppler level may be provided by the channel estimation controller.

In step 913, the receiver allocates each segment to the channel estimator. Thereafter, the procedure ends.

Figure 10:
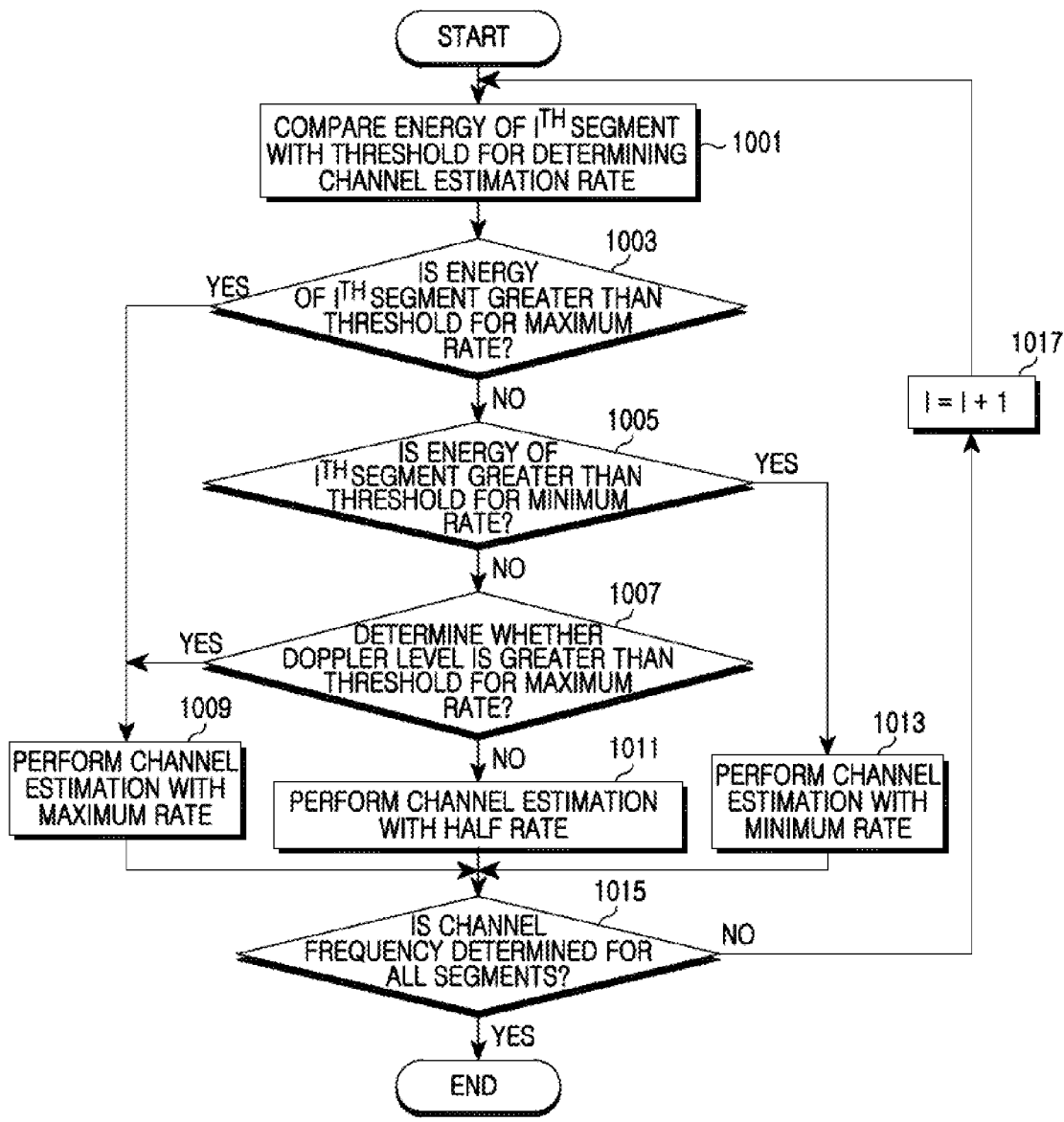
FIG. 10 is a flowchart illustrating a process of determining a channel estimation rate in a receiver according to an exemplary embodiment of the present invention.

FIG. 10 is a flowchart illustrating a process of determining a channel estimation rate in a receiver according to an exemplary embodiment of the present invention.

Referring to FIG. 10, in step 1001, the receiver compares energy of an $I^{th}$ segment with a threshold for determining a channel estimation rate. In step 1003, the receiver determines whether the energy of the $I^{th}$ segment is greater than a threshold for a maximum rate.

If it is determined in step 1003 that the segment energy is greater than or equal to the threshold for the maximum rate, in step 1009, the receiver performs channel estimation with the maximum rate.

Otherwise, if it is determined in step 1003 that the segment energy is less than the threshold for the maximum rate, in step 1005, the receiver determines whether the energy of the Ith segment is greater than a threshold for a minimum rate.

If it is determined in step 1005 that the segment energy is greater than or equal to the threshold for the minimum rate, that is, if a channel estimation criterion of using an optimal rate is satisfied, in step 1013, the receiver performs channel estimation with the minimum rate.

Otherwise, if it is determined in step 1005 that the segment energy is less than the threshold for the minimum rate, that is, if the segment energy does not satisfy both the threshold for the maximum rate and the threshold for the minimum rate, in step 1007, the receiver continues to perform the process of determining the channel estimation rate.

In step 1007, the receiver determines whether a Doppler level is greater than or equal to a threshold for a maximum rate. If the Doppler level is greater than or equal to the threshold for the maximum rate, the procedure proceeds to step 1009. Otherwise, if the Doppler level is less than the threshold for the maximum rate, in step 1011, the receiver performs channel estimation with a half rate.

In step 1015, the receiver determines whether a channel frequency is determined for all segments.

If it is determined in step 1015 that the channel frequency is not determined for all segments, in step 1017, the receiver increments a segment order by 1.

Otherwise, if it is determined in step 1015 that the channel frequency is determined for all segments, the procedure ends.

Figure 11:
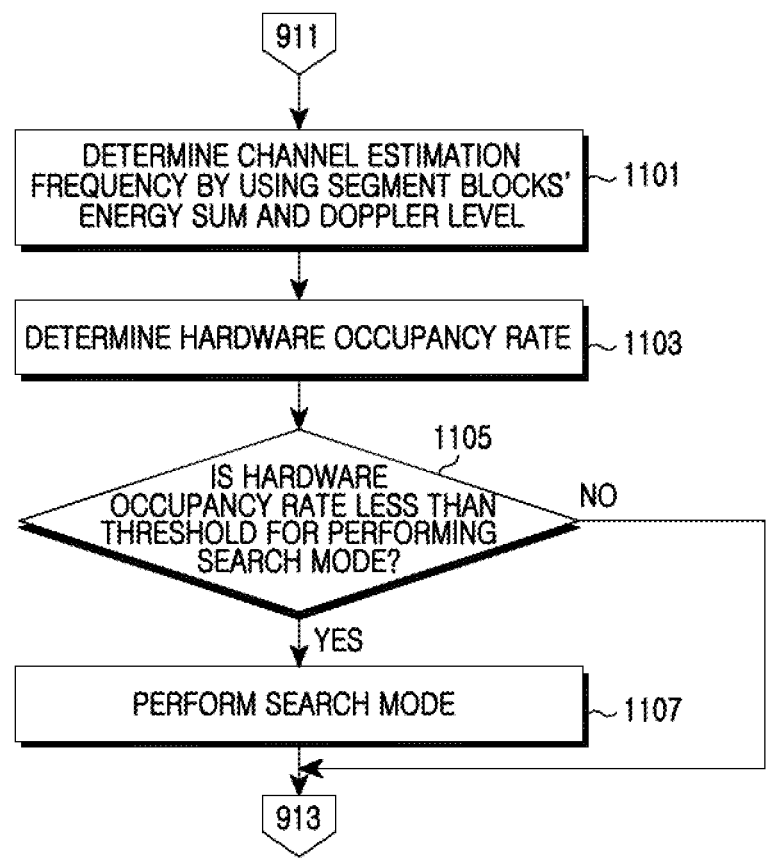
FIG. 11 is a flowchart illustrating a process of performing a channel search mode in a receiver according to an exemplary embodiment of the present invention.

FIG. 11 is a flowchart illustrating a process of performing a channel search mode in a receiver according to an exemplary embodiment of the present invention.

Referring to FIG. 11, in step 1101, the receiver determines a channel estimation frequency by using segment blocks' energy sum and a Doppler level. Step 1101 corresponds to the step 911 of FIG. 9.

In step 1103, the receiver determines a hardware occupancy rate required for channel estimation of the receiver. The receiver may determine the hardware occupancy rate by using Equation (7) below.

$$\text{Occupancy\_rate} = \frac{1}{N_{seg}} \sum_{i=0}^{N_{seg}} r(i) \quad (7)$$

In Equation (7), r(i) denotes a segment time occupancy rate for an $i^{th}$ segment and is equal to a segment channel estimation rate. Accordingly, r(i)=1 if estimation is performed with a maximum estimation rate, and r(i)=0.5 if estimation is performed with a half rate.

If an occupancy rate is 1 for all hardware segments, it implies that estimation is performed for all hardware segments with a maximum rate. If the occupancy rate is less than 1 for all hardware segments, it implies that there is an unused hardware segment.

In step 1105, the receiver determines whether a hardware occupancy rate is less than a threshold for performing a search mode in step 1107. If it is determined that the hardware occupancy rate is less than the threshold, segments with a low estimation rate share hardware segments to reduce hardware size in an initial design process and to reduce power consumed during operation, and unused hardware segments are used in a search mode for a neighbor tap region or another channel.

In step 1107, the search mode searches for a neighbor channel tap by regulating a PN phase, and may also be used when implementing a PN signal with a different code IDentification (ID).

The reason of comparing the hardware occupancy rate with the threshold for performing the search mode as described in step 1105 is to compare accuracy of the search mode and complexity of control so that the search mode is not operated when the occupancy rate is less than 1 and the search mode is operated only when the occupancy rate is less than or equal to a specific level.

Figure 12A:
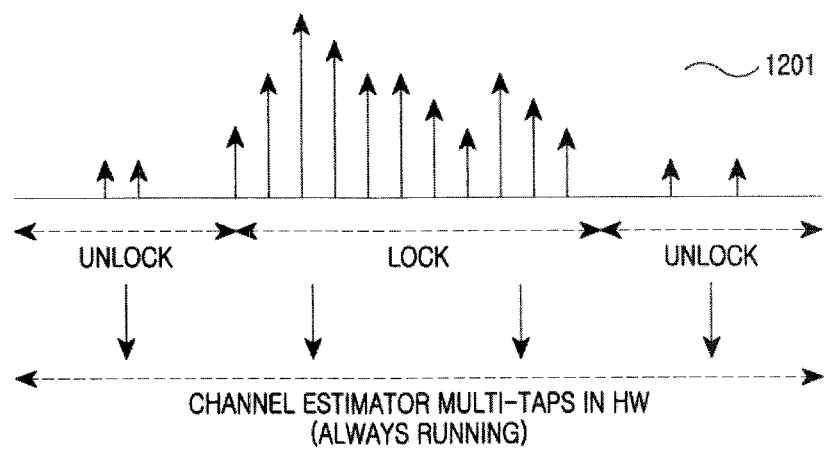
FIG. 12A illustrates a performance of a receiver according to the related art.
Figure 12B:
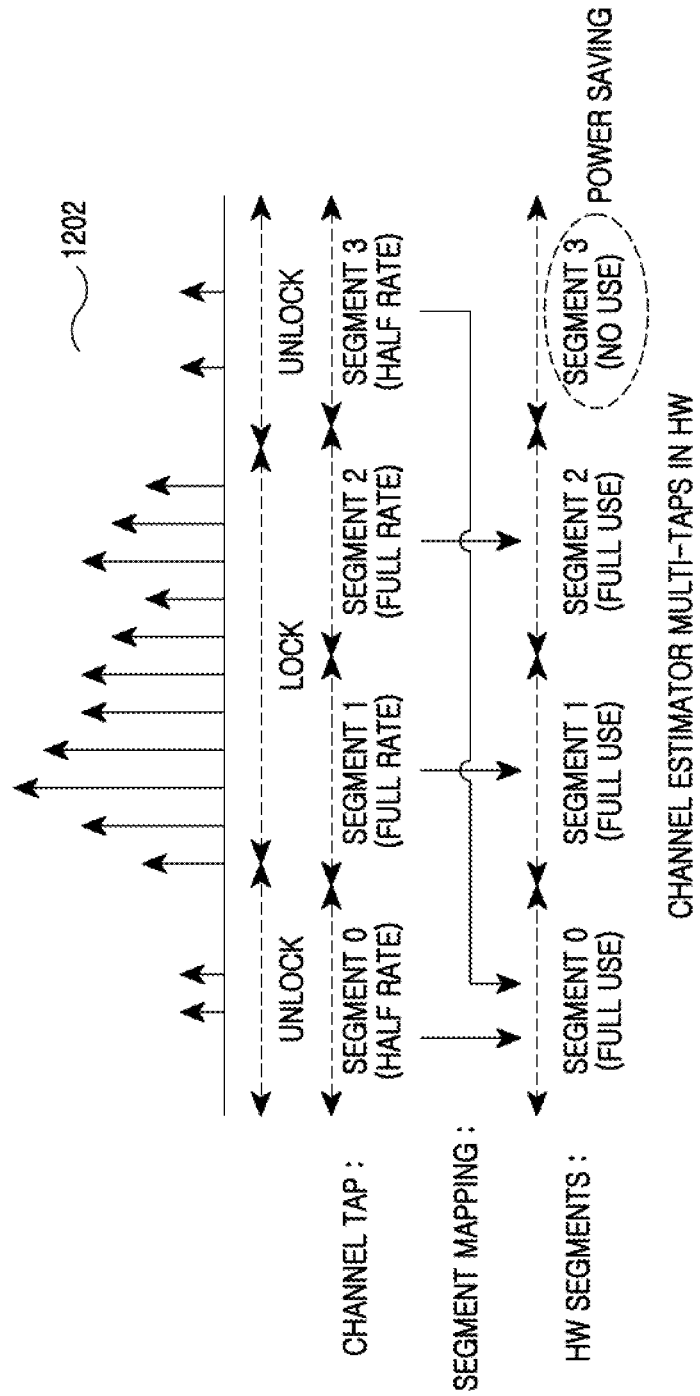
FIG. 12B illustrates a performance of a receiver according to an exemplary embodiment of the present invention.

FIGS. 12A-12B illustrate a performance difference between a conventional receiver and a receiver according to an exemplary embodiment of the present invention.

FIG. 12A illustrates a performance of the conventional receiver.

Referring to FIG. 12A, the conventional receiver 1201 processes a received signal in such a manner that a channel estimator with a long tap persistently performs channel estimation with a constant rate all the time, and an equalizer locks a region having high tap energy and unlocks a region having low tap energy. As illustrated in FIG. 12A, disadvantageously, the channel estimator has to be designed to have a sufficiently long tap and all taps have to operate all the time.

FIG. 12B illustrates a performance of a receiver according to an exemplary embodiment of the present invention.

Referring to FIG. 12B, an operational performance of a receiver 1202 is illustrated in a condition where a search mode is not provided. A channel tap region to be estimated is divided into four segments. According to a segment energy block sum, a segment 1 and a segment 2 are assigned with full rate estimation and a segment 0 and a segment 3 are assigned with half rate estimation. As a result, the segment 1 and the segment 2 always allocate hardware segments (i.e., full use), and the segment 0 and the segment 3 share a Hardware (HW)

segment 0. Therefore, a hardware occupancy rate is 0.75, and an HW segment 3 is unused. Thereby, power consumption is reduced.

Figure 12C:
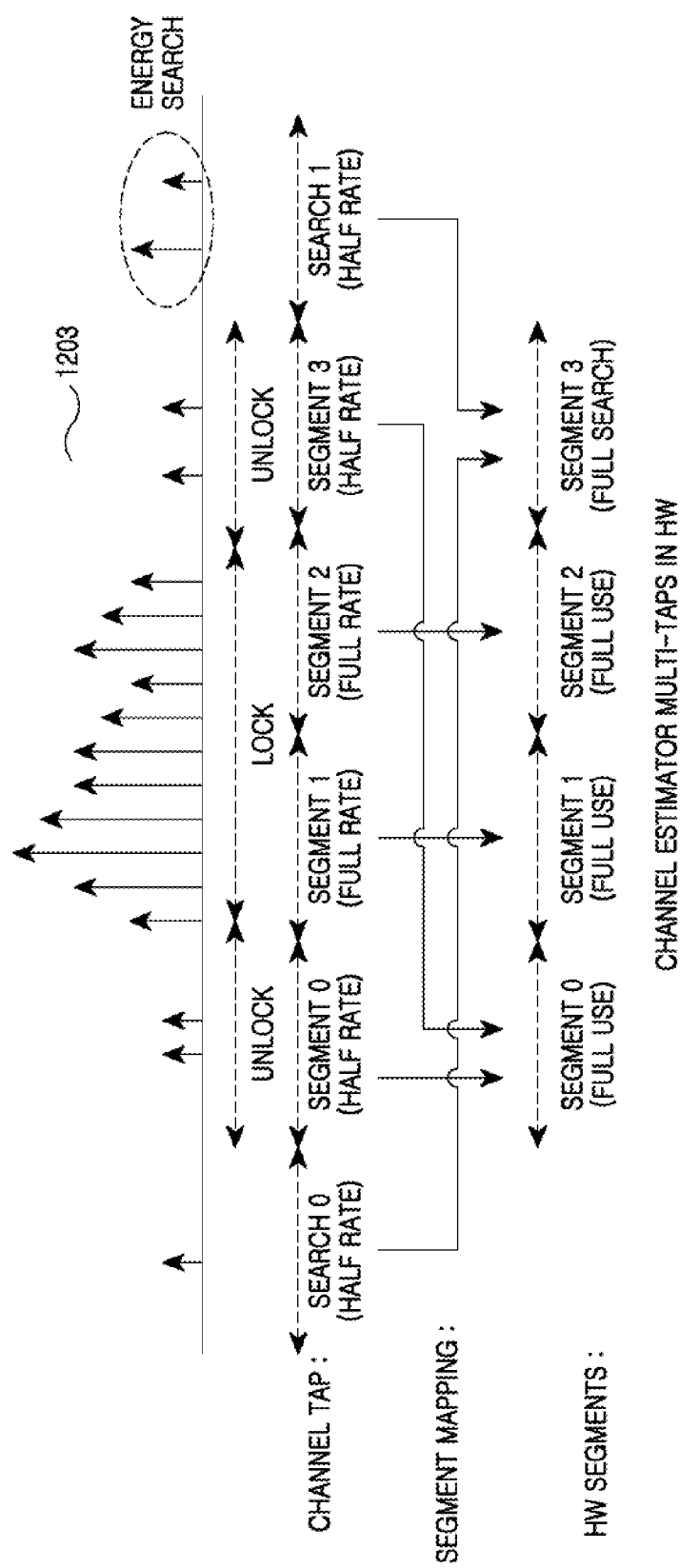
FIG. 12C illustrates a performance of a receiver according to an exemplary embodiment of the present invention.

FIG. 12C illustrates a performance of a receiver according to an exemplary embodiment of the present invention.

Referring to FIG. 12C, an operational performance of a receiver 1203 is illustrated in a condition where a search mode is provided. An operation of allocating segments of a channel tap to hardware segments is identical to an operation used in the absence of the search mode. Likewise, a hardware occupancy rate is 0.75, and even if an HW segment 3 is not used, a reception performance does not deteriorate. However, the HW segment 3 unused in the search mode is allocated for a neighbor channel search. As illustrated in FIG. 12C, energy of a neighbor channel is detected. Therefore, traffic performance may be improved when such information is used in advance.

According to exemplary embodiments of the present invention, hardware complexity is reduced by decreasing a multi-tap size in an equalizer-based receiver of a mobile communication system. A channel estimation rate is determined by dividing the multi-tap size into a plurality of segments, and thus hardware size and power consumption of the receiver may be decreased.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An apparatus for channel estimation in a mobile communication system, the apparatus comprising:
   an adaptive multi-tap segment channel estimator configured to divide a channel tap region within a channel to be estimated into a plurality of segments, configured to determine a channel estimation frequency and a segment size for each of the plurality of segments, and configured to allocate each of the plurality of segments to the adaptive multi-tap segment channel estimator,
   wherein the adaptive multi-tap segment channel estimator regulates the channel estimation frequency according to each segment's energy.

2. The apparatus of claim 1, wherein the adaptive multi-tap segment channel estimator determines a delay spread value by determining time average power for each of the plurality of segments to determine a segment size for each of the plurality of segments in such a manner that, if the delay spread value is small, the segment size comprises a small size, and if the delay spread value is large, the segment size comprises a large size.

3. The apparatus of claim 2, wherein the delay spread value comprises a Root Mean Square (RMS) delay spread.

4. The apparatus of claim 1, wherein the adaptive multi-tap segment channel estimator determines a sum of energy for each of the plurality of segments and determines the channel estimation frequency by using the determined energy sum and a Doppler level.

5. The apparatus of claim 1, wherein the adaptive multi-tap segment channel estimator regulates a hardware usage rate according to the channel estimation frequency.

6. The apparatus of claim 5, wherein the adaptive multi-tap segment channel estimator determines segment mapping information to perform mapping to a hardware segment.

7. The apparatus of claim 5, wherein the adaptive multi-tap segment channel estimator determines a hardware occupancy rate at the channel estimation frequency to regulate the hardware usage rate in such a manner that, if an unused hardware segment is detected by using the hardware occupancy rate, at least one of a neighbor tap region and another channel is searched for by using the unused hardware.

8. The apparatus of claim 7, wherein the adaptive multi-tap segment channel estimator determines a hardware occupancy rate at the channel estimation frequency to regulate the hardware usage rate in such a manner that, if a hardware occupancy rate is less than a predefined threshold, segments with a low hardware occupancy rate share hardware segments to reduce hardware size and power consumed.

9. A method for channel estimation in a mobile communication system, the method comprising:
   dividing, by an adaptive multi-tap segment channel estimator, a channel tap region within a channel to be estimated into a plurality of segments;
   determining a channel estimation frequency and a segment size for each of the plurality of segments; and
   allocating each of the plurality of segments to the adaptive multi-tap segment channel estimator,
   wherein the channel estimation frequency is regulated according to each segment's energy.

10. The method of claim 9, wherein the determining of the segment size for each of the plurality of segments comprises:
   determining a delay spread value by determining time average power for each of the plurality of segments; and
   determining a segment size for each of the plurality of segments in such a manner that, if the delay spread value is small, the segment size comprises a small size, and if the delay spread value is large, the segment size comprises a large size.

11. The method of claim 10, wherein the delay spread value comprises a Root Mean Square (RMS) delay spread.

12. The method of claim 9, wherein the determining of the channel estimation frequency comprises:
   determining a sum of energy for each of the plurality of segments; and
   determining the channel estimation frequency by using the determined energy sum and a Doppler level.

13. The method of claim 9, further comprising regulating a hardware usage rate according to the channel estimation frequency.

14. The method of claim 13, further comprising determining segment mapping information to perform mapping to a hardware segment.

15. The method of claim 13, wherein the regulating of the hardware usage rate comprises:
   determining a hardware occupancy rate at the channel estimation frequency; and
   regulating the hardware usage rate in such a manner that, if an unused hardware segment is detected by using the hardware occupancy rate, at least one of a neighbor tap region and another channel is searched for by using the unused hardware.

16. The method of claim 15, wherein the regulating of the hardware usage rate further comprises that, if a hardware occupancy rate is less than a predefined threshold, segments with a low hardware occupancy rate share hardware segments to reduce hardware size and power consumed.

* * * * *